April 22, 1924.
J. CANNING
CIRCULAR SAWING MACHINE
Filed July 5, 1919 2 Sheets-Sheet 2
1,491,287
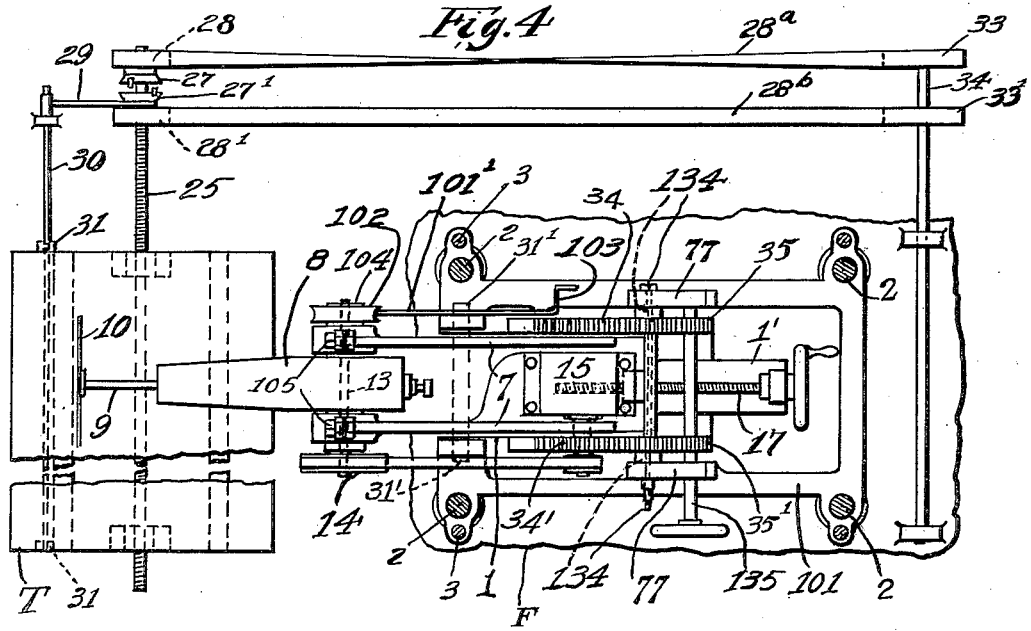
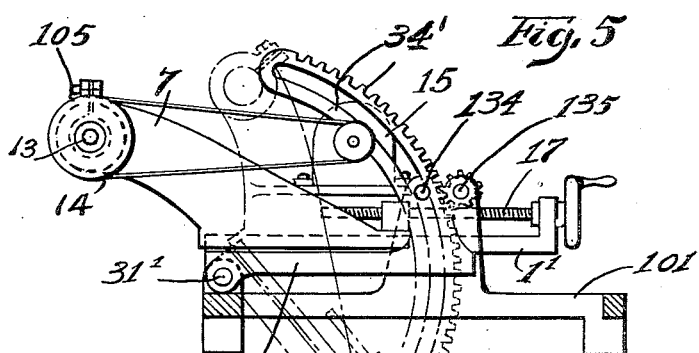
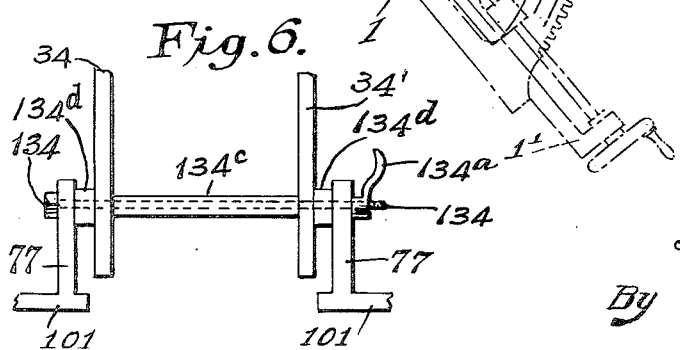
Inventor
James Canning
By *[signature]*
Attorney Patented Apr. 22, 1924.

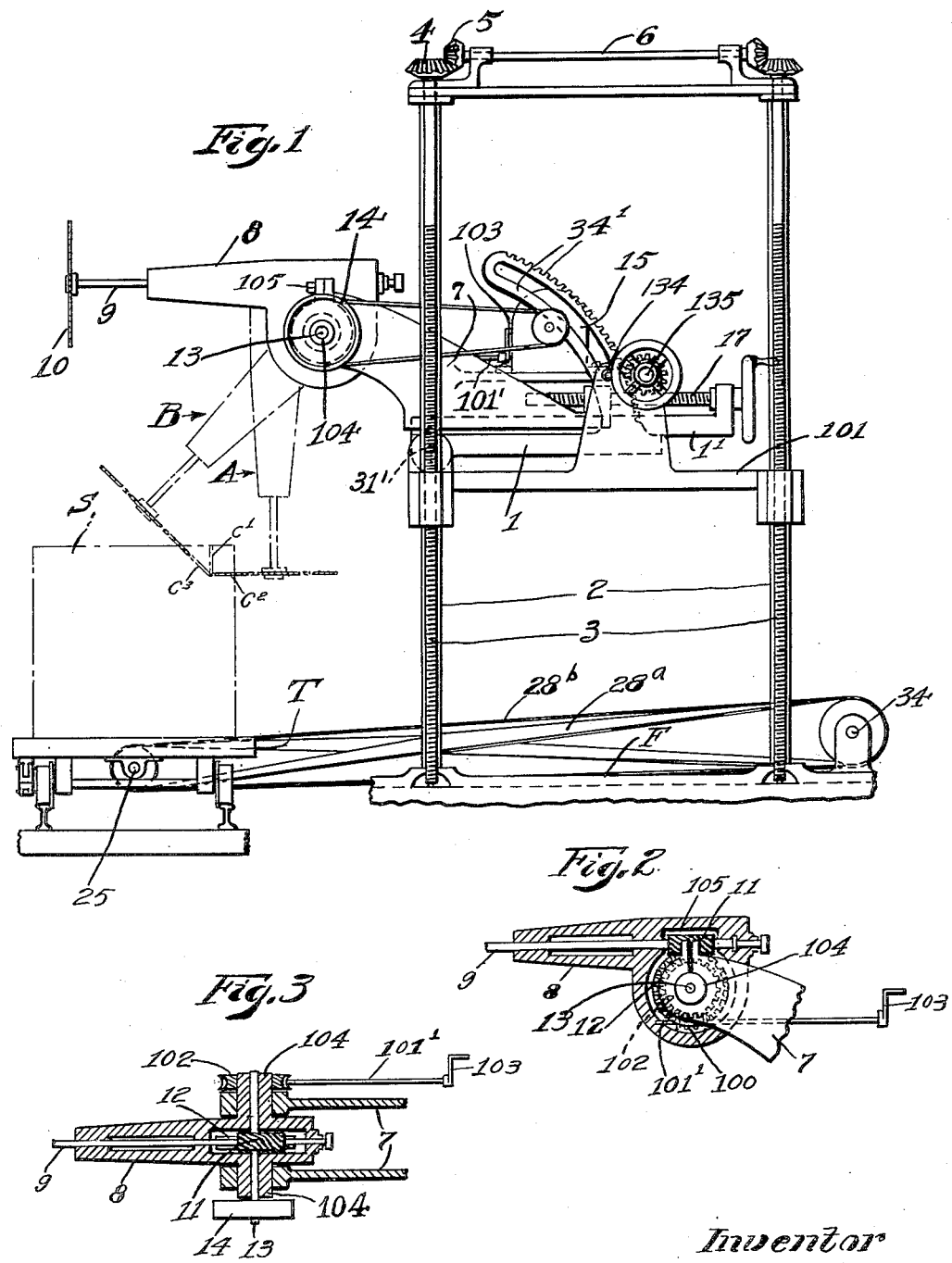

1,491,287

UNITED STATES PATENT OFFICE.

JAMES CANNING, OF MONTPELIER, VERMONT, ASSIGNOR TO LANE MANUFACTURING COMPANY, OF MONTPELIER, VERMONT, A CORPORATION OF VERMONT.

CIRCULAR SAWING MACHINE.

Application filed July 5, 1919. Serial No. 308,895.

*To all whom it may concern:*

Be it known that I, JAMES CANNING, a citizen of the United States, residing at Montpelier, county of Washington, State of Vermont, have invented certain new and useful Improvements in Circular Sawing Machines, of which the following is a specification.

This invention relates to stone working machinery and particularly to a cutting machine of the saw type.

In working large blocks of stone, it is usually necessary previous to the surfacing operations to channel out or step the edge of the block in order to avoid any possibility of crumbling the edge by striking a flaw or other irregularity in the texture of the stone.

This channeling process is expensive and tedious when done by hand and there has not heretofore, as far as I am informed, been any suitable machine capable of rapidly performing this operation.

While this machine is especially adapted for this operation, it has a broader field of utility and is capable of performing a variety of other general operations. As illustrative of my invention I have shown in the present embodiment a machine of the type above referred to and which is well adapted to the end sought. Throughout the specification and drawings like reference characters are employed to indicate corresponding parts.

In the drawings:

Fig. 1 is an end elevation of a machine in accordance with my invention.

Figs. 2 and 3 are detail sections through the tilting saw mandrel.

Fig. 4 is a partial plan view.

Fig. 5 is a detail illustrating the construction for tilting the saw, and

Fig. 6 is a detail view showing the clamping bolt for holding the tilting adjustment of the saw carriage.

The saw carriage $1^1$ is mounted upon a tilting frame 1 which in turn is carried by a slotted main frame 101 that is adjustable vertically on the columns 2 of a framework F, the slot in main frame 101 being large enough to allow the entire mechanism carried on tilting frame 1 and carriage $1^1$ to pass therethrough when it is desired to vary the angle of cut in the stone S which is supported upon a truck T movable longitudinally past the sawing machine. The tilting frame 1 is pivoted at $31^1$ to the main frame 101 to allow the saw to be tilted.

The vertical adjustment of the saw is effected by elevating screws 3 which may be operated by gears 4 and 5 and cross shaft 6. The longitudinal adjustment of the truck T may be effected by a longitudinally extending feed screw 25, and provision may be made for automatically reversing the direction of feed of the truck as it approaches either limit of its longitudinal travel. The fine adjustment of the saw may be had by an adjustment screw 17 which feeds the saw carriage $1^1$ towards and from the stone, and this adjustment may be held in any suitable manner. The tilting frame 1 and the parts supported thereon are adjusted by means of a pair of quadrants 34, $34^1$, pinions 35, $35^1$, and pinion shaft 135, this adjustment being held by a clamping bolt 134 working in the quadrant slot.

To the carriage $1^1$ is bolted a bifurcated bracket casting 7 on which is pivotally mounted a saw arm or case 8 having suitable bearings for a saw shaft or mandrel 9 upon which a circular saw 10 is mounted. Near its inner end the shaft 9 has a spiral gear 11 which meshes with and is driven by a larger gear 12 on a shaft 13, (Figs. 2, 3 and 7) which has a pulley 14 adapted to be belted to a motor 15 mounted on the saw carriage.

The furcations of the bracket 7 which supports the swivelling saw arm 8 have large openings to receive hollow trunnions 104 on the saw arm through which passes the shaft 13, and are split and provided with clamping screws 105 by means of which the saw arm may be held at a desired angle after it has been set at this angle.

The mechanism for adjusting the saw arm angularly may be a simple worm and pinion mechanism, comprising a worm 100 mounted on a worm shaft $101^1$ and meshing with a pinion 102 fast on one of the trunnions 104 of the saw arm 8. Shaft $101^1$ may be operated as by crank 103.

The saw is adjusted horizontally towards and from the stone S by feeding the carriage $1^1$ over the tilting frame 1, as by feed screw 17, said frame 1 and carriage having suitably guided travel on one another.

To the tilting frame 1 are secured the duplicate quadrants 34, $34^1$, by means of which said frame and with it the carriage 1¹ may be lowered through the slot of main frame 101 to the same angle at which the saw has been set by the controlling mechanism 100, 101¹, 102 and 103.

The pinions 35 and 35¹ are mounted on a pinion shaft 135, and the tilting adjustment is held by the clamping bolt 134 (Figs. 4, 5 and 6) which works in the quadrant slots and is adapted to be tightened when the proper angle is reached to clamp the quadrants against the projections 77 which rise from the top of the main frame 101 and carry the pinion shaft 135 and bolt 134. The bolt 134 is set through a sleeve 134ᶜ which is disposed between the quadrants 34 and 34¹. Fast on the bolt between the quadrants and the adjacent ribs 77 are collars 134ᵈ. By turning the hand nut 134ᵃ of the bolt, the head 134ᵇ of the bolt is drawn against the adjacent rib 77 and the quadrants are thereby pinched against said ribs.

In the full line position of Fig. 1, the saw is adjusted for a vertical cut, and when the carriage is run down upon the elevating screws 3 will make the vertical cut C¹ indicated in Fig. 1. To make the horizontal cut C², the arm 8 is released and swung down by the worm and pinion mechanism 100, 101¹, 102, 103, to the position shown by the dotted lines A, Fig. 1, where it is again clamped. To make the diagonal cut or bevel C³, the saw is swung downwardly, as indicated by the dotted lines B, Fig. 1, and clamped, and the saw carriage is lowered to the same angle by means of the quadrant and pinion mechanism. The carriage 1¹ may be adjusted by the screw 17 back and forth on frame 1 to feed the saw deeper into the cut or to withdraw it therefrom.

These several cuts may be rapidly and accurately made by my machine, and without tipping the stone. As will be obvious, the angularity of the cut may be varied at will.

As here shown, the mechanism for feeding and reversing the truck T as it approaches its limit of longitudinal travel in either direction comprises the reversible feed screw 25 arranged longitudinally of the truck and provided with clutch pulleys 28 and 28¹ having opposed clutch faces 27 and 27¹, and adapted to be alternately engaged and disengaged as by a clutch shifting arm 29 on a longitudinally slidable clutch operating rod 30. Adjustably mounted on said rod 30 at either end of the truck T are stops 31 adapted to be alternately actuated by contact with the sliding truck as it approaches the limit of its feeding movement in either direction whereby to actuate the rod 30 and move the clutch pair 27—27¹ into and out of engagement, according to the direction of travel of the truck, thus automatically reversing the direction of feed. The clutch pulleys 28 and 28¹ are connected as by the crossed and open belts 28ᵃ and 28ᵇ, respectively, with other pulleys 33 and 33¹, respectively, mounted on a power shaft 34 which may be journaled in suitable bearings upon the frame F and is adapted to be rotated in a constant direction from any suitable power source.

Various modifications in the construction and arrangement of my machine may obviously be resorted to, if within the limits of the appended claims.

What I therefore claim and desire to secure by Letters Patent is:

1. In combination, a support, a pair of overhanging bracket arms mounted thereon, a saw arm pivoted to said bracket arms and extending longitudinally therebetween, a drive shaft journaled through the saw arm pivot, a spiral gear on said drive shaft, a saw spindle mounted in the longitudinal axis of said saw arm, and a spiral gear on said spindle meshing with the spiral gear on said drive shaft.

2. In combination, a frame, a platform adjustable vertically thereon, a pair of overhanging bracket arms mounted on said platform, a hollow saw arm pivoted to said bracket arms and extending longitudinally therebetween, a drive shaft journaled through the saw arm pivot, a saw spindle mounted in the longitudinal axis of said saw arm rotation transmitting connections between said drive shaft and spindle, and clamping means for fixing the position of said saw arm relative to said bracket arms.

3. In a stone sawing machine, a supporting frame, a slotted main frame adjustable vertically thereon, a tilting frame pivoted to said main frame and adapted to swing through the slot thereof, a saw carriage adjustable rectilinearly on said tilting frame, and a saw pivotally mounted on said carriage.

4. In a stone sawing machine, a supporting frame, a slotted main frame adjustable vertically thereon, a tilting frame pivoted to said main frame and adapted to swing through the slot thereof, a saw carriage adjustable rectilinearly on said tilting frame, a saw pivotally mounted on said carriage, means for varying the angular position of the saw relative to the work, and means for adjusting the tilting frame and with it the saw carriage to correspond with the angular positioning of the saw.

5. In a stone sawing machine, a supporting frame, a slotted main frame adjustable vertically thereon, a tilting frame pivoted to said main frame and adapted to swing through the slot thereof, a saw carriage adjustable rectilinearly on said tilting frame, a saw pivotally mounted on said carriage, means for varying the angular position of the saw relative to the work, a rack and pinion mechanism for adjusting the tilting frame and with it the saw carriage to correspond with the angular positioning of the saw.

6. In a stone sawing machine, a relatively fixed bifurcated bracket, a saw case having hollow trunnions set in the furcations of said bracket and constituting a pivotal connection, a saw mandrel in said saw case, a drive shaft journaled in said hollow trunnions and operatively connected with said mandrel, and means for rotating said saw case about its pivot as an axis to vary the angle of cut.

7. In a stone sawing machine, a relatively fixed bifurcated bracket, a saw case having hollow trunnions set in the furcations of said bracket and constituting a pivotal connection, a saw mandrel in said saw case, a drive shaft journaled in said hollow trunnions and operatively connected with said mandrel, and a worm and pinion mechanism for rotating said saw case about the pivot as an axis to vary the angle of cut.

8. In a saw, a pair of bracket arms, a saw arm pivoted to said bracket arms and extending longitudinally therebetween, a saw spindle mounted in the longitudinal axis of said saw arm, a drive shaft journaled longitudinally through the axis of the pivot for the bracket and rotation transmitting connections between said drive shaft and spindle.

9. In a saw, a slotted main frame, a tilting frame pivoted thereto to swing bodily through the slot thereof, and a saw carriage mounted on said pivoted frame.

10. In a saw, a slotted main frame, a tilting frame pivoted thereto to swing bodily through the slot thereof, and a saw carriage adjustable rectilinearly on said pivoted frame.

11. In a saw, a slotted main frame, a tilting frame pivoted thereto to swing bodily through the slot thereof, a saw carriage mounted on said tilting frame, a pair of toothed quadrants carried by said tilting frame, a pinion shaft extending transversely of said quadrants, and pinions on said shaft meshing with the quadrant teeth.

12. In a sawing machine, a frame, a work support adjustable longitudinally relative thereto, a bracket projecting laterally from said frame and overhanging said work support, and a saw journaled in said bracket with its axis of rotation at right angles to the direction of travel of the work support.

In testimony whereof I affix my signature in presence of two witnesses.

JAMES CANNING.

Witnesses:
 REBECCA YETT,
 P. P. PITKIN.